United States Patent [19]

Schmidt et al.

[11] Patent Number: 4,985,009
[45] Date of Patent: Jan. 15, 1991

[54] TENSIONING DEVICE FOR CHAIN OR BELT DRIVES

[75] Inventors: Dieter Schmidt, Nuremberg; Bolko Schuseil, Erlangen, both of Fed. Rep. of Germany

[73] Assignee: INA Walzlager Schaeffler KG, Fed. Rep. of Germany

[21] Appl. No.: 528,030

[22] Filed: May 23, 1990

[30] Foreign Application Priority Data

Jul. 5, 1989 [DE] Fed. Rep. of Germany ....... 3922037

[51] Int. Cl.$^5$ .............................................. F16H 7/08
[52] U.S. Cl. ................................... 474/110; 474/138
[58] Field of Search ........................ 474/101, 109–111, 474/113–117, 133, 135, 136, 138

[56] References Cited

U.S. PATENT DOCUMENTS

| | | | |
|---|---|---|---|
| 4,772,251 | 9/1988 | Goppelt et al. | 474/138 X |
| 4,792,322 | 12/1988 | Goppelt et al. | 474/138 X |
| 4,911,680 | 3/1990 | Kodama et al. | 474/110 X |
| 4,940,447 | 7/1990 | Kawashima et al. | 474/138 X |

*Primary Examiner*—Thuy M. Bui
*Attorney, Agent, or Firm*—Bierman and Muserlian

[57] ABSTRACT

A tensioning device for chain or belt drives comprising a damping piston guided in a cylindrical housing and loaded in the chain tensioning direction by a compression spring located in the housing, wherein a high pressure chamber for hydraulic fluid is situated between the housing bottom and the damping piston and is open via a leakage gap formed by the guide bore of the housing and the damping piston and closed with respect to an oil reservoir by a non-return valve, the hydraulic pressure in the high pressure chamber during the operation of the tensioning device being higher in the cold state than in the heated state due to differences in viscosity, characterized in that the high pressure chamber is delimited by an additional piston acting as an overpressure piston on which a second compression spring acts in the direction of the high pressure chamber, the overpressure piston being able to bear against a fixed stop and the spring force of the second compression spring and the effective surface of the overpressure piston are so dimensioned that in the cold state, the overpressure piston is displaceable by the force applied to it by the hydraulic pressure and in the heated state, it is retained at the fixed stop by the second compression spring.

8 Claims, 1 Drawing Sheet

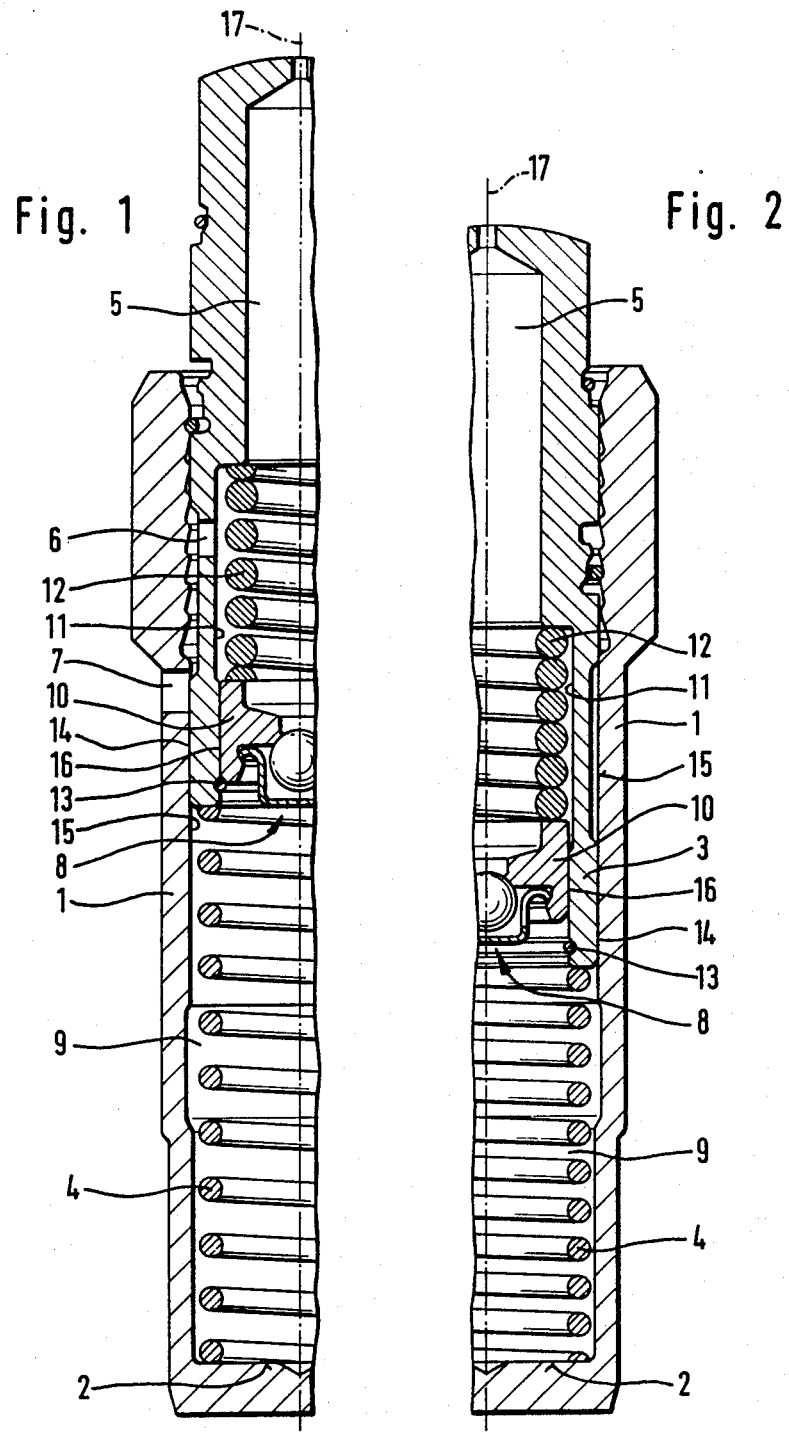

TENSIONING DEVICE FOR CHAIN OR BELT DRIVES

STATE OF THE ART

Tensioning devices for chain or belt drives comprising a damping piston guided in a cylindrical housing and loaded in the chain tensioning direction by a compression spring located in the housing, wherein a high pressure chamber for hydraulic fluid is situated between the housing bottom and the damping piston and is open via a leakage gap formed by the guide bore of the housing and the damping piston and closed with respect to an oil reservoir by a non-return valve, the hydraulic pressure in the high pressure chamber during the operation of the tensioning device being higher in the cold state than in the heated state due to differences in viscosity are known.

Such a tensioning device operating according to the leakage gap principle is known from EP-OS No. 0,266,565. In this, the damping behaviour of the oil used as hydraulic fluid in the high pressure chamber of the housing depends on the dynamic toughness (viscosity) of the oil which varies with the temperature. The damping factor of this tensioning device is so designed that the optimum dynamic behaviour of the chain or belt drive is obtained in the usual operating condition when the oil temperature is approximately 100° to 135° C. With its cooling to lower temperatures, the dynamic toughness of the oil increases so that the damper shows a correspondingly harder behaviour. The direct result of this can be noise development and wear at the tensioning rails and transmission elements of the drive.

OBJECTS OF THE INVENTION

It is an object of the invention to provide a tensioning device so that it shows a uniform behaviour largely independent of differences in oil viscosity over a large temperature range.

This and other objects and advantages of the invention will become obvious from the following detailed description.

THE INVENTION

The novel tensioning device of the invention for chain or belt drives comprising a damping piston guided in a cylindrical housing and loaded in the chain tensioning direction by a compression spring located in the housing, wherein a high pressure chamber for hydraulic fluid is situated between the housing bottom and the damping piston and is open via a leakage gap formed by the guide bore of the housing and the damping piston and closed with respect to an oil reservoir by a non-return valve, the hydraulic pressure in the high pressure chamber during the operation of the tensioning device being higher in the cold state than in the heated state due to differences in viscosity, is characterized in that the high pressure chamber is delimited by an additional piston acting as an overpressure piston on which a second compression spring acts in the direction of the high pressure chamber, the overpressure piston being able to bear against a fixed stop and the spring force of the second compression spring and the effective surface of the ovepressure piston are so dimensioned that in the cold state, the overpressure piston is displaceable by the force applied to it by the hydraulic pressure and in the heated state, it is retained at the fixed stop by the second compression spring.

The high pressure chamber is delimited by an additional piston acting as overpressure piston on which a second compression spring acts in the direction of the high pressure chamber, the overpressure piston being able to bear against a fixed stop and the spring force of the second compression spring and the effective surface of the overpressure piston are so dimensioned that in the cold state, the overpressure piston is displaceable by the force applied to it by the hydraulic pressure and in the heated state, it is retained at the fixed stop by the second compression spring.

In this way, when excessive loads occur, as they do as a result of low temperatures and high viscosity of the hydraulic fluid connected therewith, the overpressure piston can move in a direction to increase the volume of the high pressure chamber so that the movement of the damping piston further into the housing is facilitated. Such a movement of the overpressure piston takes place from a certain load level on when the force applied by the hydraulic fluid to the overpressure piston is larger than the force of the second compression spring. By its compensating function, which becomes effective from a certain load level on, the overpressure piston therefore prevents too high forces from occuring in the chain or belt drive and guarantees at the same time the maintenance of a certain pressure level in the high pressure chamber. In this way, pressure pulsations and the negative effects on the dynamic behaviour of the tensioning device connected therewith, such as would frequently occur with pressure relief valves, are avoided.

In an advantageous manner, the overpressure piston can be arranged axially displaceably in the housing so that the housing can be given a simple circular cylindrical structure. The second compression spring can also be arranged in the housing. In a preferred embodiment, the second compression spring is arranged between the overpressure piston and the damping piston.

In order not to have to increase the length of the elements of the tensioning device for the mounting of the overpressure piston, and at the same time to be able to dispose of the full volume of the high pressure chamber and of the oil reservoir, it is of advantage that the second compression spring and the overpressure piston are arranged in a bore of the damping piston, which bore, together with the overpressure piston, forms a second leakage gap which opens the high pressure chamber to the oil reservoir. The overpressure piston is thus integrated into the damping piston so that a highly compact construction is obtained.

It is advantageous to arrange the non-return valve at the overpressure piston so that a special component for the valve seat becomes superfluous and the function of the valve seat is assumed by the overpressure piston. A stop ring for the overpressure piston can be inserted into the damping piston into a ring groove starting at its bore. Thus the one end position of the overpressure piston, within the damping piston, is fixed in a simple manner.

REFERRING NOW TO THE DRAWINGS

FIG. 1 is a longitudinal cross section through the part of a tensioning device situated to the left of the center line in the working position at normal operating temperature; and FIG. 2 is a longitudinal cross section through the part of the tensioning device situated to the right of the center line in the working position at excessive loading.

A damping piston 3 is arranged to be axially displaceable in a housing 1 in the form of a circular cylinder which is frontally closed at one of its ends by a bottom 2. At its end turned away from the bottom 2, the damping piston 3 projects out of the housing 1 and forms a stop surface there for the chain tensioning rail or the chain or belt tensioning wheel to be tensioned. The end of the damping piston 3 located in the housing 1 is frontally supported on a first compression spring 4 which is located as a cylindrical helical spring in the housing 1 and which bears against the bottom 2 with its other end.

The damping piston 3 is made as a hollow body and comprises an oil reservoir 5 which can be filled with oil via a radial opening 6, an annular space formed there between the damping piston 3 and the housing 1 and a hydraulic oil connection 7 as a radial opening of the housing 1. This oil reservoir 5 in the damping piston 3 is separated by a non-return valve 8 from a high pressure chamber 9 formed by the housing 1 along the axial length not occupied by the damping piston 3.

According to the invention, the high pressure chamber 9 is delimited by an overpressure piston 10 which, in the example of the embodiment, is located in an axial bore 11 which starts from the frontal end of the damping piston 3 located within the housing 1. A second compression spring 12 arranged in the bore 11 of the damping piston 3 acts on the overpressure piston 10 in the direction of the high pressure chamber 9 of the housing 1. The second compression spring 12, like the first compression spring 4, is a cylindrical helical spring and its spring force is larger than that of the first compression spring 4.

At its end position near the high pressure chamber 9, the overpressure piston 10 is retained by a stop ring 13 which is inserted into a circular ring-shaped groove starting from the bore 11 of the damping piston 3. Its other end position, further away from the high pressure chamber 9, is determined by the second compression spring 12 when this is compressed to its block length.

In this way, the high pressure chamber 9 communicates with the oil reservoir 5 not only via the leakage gap 14 which is formed by the guide bore 15 of the housing 1 and the outer surface of the damping piston 3, but there also exists, between the bore 11 of the damping piston 3 and the overpressure piston 10, a second leakage gap 16 through which, on the movement of the damping piston 3 further into the housing 1, oil can flow from the high pressure chamber 9 into the oil reservoir 5, the damping of the piston movement being effected by the fluid friction.

The overpressure piston 10 is the carrier of the valve seat for the non-return valve 8 which is so designed that it is closed during a movement of the overpressure piston 10 towards the high pressure chamber 9 while it can be open during a movement in the opposite direction. A valve ball as shut-off member bears against the valve seat on the side of the overpressure piston 10 turned towards the high pressure chamber 9.

When the operating temperature of approximately 100° to 135° C. has been reached, the overpressure piston 10 takes its end position near the high pressure chamber 9 in the damping piston 3, i.e., it bears against the stop ring 13 as represented in FIG. 1 of the drawing on the left-hand side of the center line 17. In this position, the overpressure piston 10 is retained by the second compression spring 12. The force of the second compression spring 12 is so large that the overpressure piston 10 does not get disengaged from the stop ring 13 when operation-dependent pressure variations occur in the high pressure chamber 9. Thus, it moves exactly as the damping piston 3.

However, when the operating temperature has not yet been reached, so that the viscosity of the hydraulic oil in the high pressure chamber 9 is substantially higher than in the operating condition, a higher fluid friction results in the leakage gaps 14 and 16 which leads to the damping piston 3 getting pressed into the housing 1. As a result of these higher frictional forces and the resultant higher pressure in the high pressure chamber 9, the overpressure piston 10 is pushed against the action of the force of the second compression spring 12 further into the bore 11 of the damping piston 3 so that the volume of the high pressure chamber 9 is thus increased and the pressure diminished. The movement of the overpressure piston 10 is possible till the turns of the second compression spring 12 come to bear against one another, that is to say, till the second compression spring 12, as represented in FIG. 2, gets compressed to its block length.

Thus, during dynamic loading in the operating temperature range, the overpressure piston 10 does not execute any relative movement in the damping piston 3. Only at excessive loads such as occur at low temperatures, and with the high viscosity of the oil resulting therefrom, does the overpressure piston 10 move inversely to the damping piston 3. This movement takes place from a certain load level on which is dependent on the force of the second compression spring 12.

A further advantage which can be gained with the invention is that the load peaks occuring at certain resonance points of the engine speed range and the resulting negative effects, like noise development and wear, can be restricted to the chain or belt drive without substantial limitation of the dymanic properties of the tensioning device.

Various modifications of the tensioning device of the invention may be made without departing from the spirit or scope thereof and it is to be understood that the invention is intended to be limited only as defined in the appended claims.

What I claim is:

1. A tensioning device for chain or belt drives comprising a damping piston guided in a cylindrical housing and loaded in a chain tensioning direction by a compression spring located in the housing, wherein a high pressure chamber for hydraulic fluid is situated between a housing bottom and the damping piston and is open via a leakage gap formed by a guide bore of the housing and the damping piston and closed with respect to an oil reservoir by a non-return valve, an hydraulic pressure in the high pressure chamber during the operation of the tensioning device being higher in a cold state than in a heated state due to differences in viscosity, characterized in that the high pressure chamber is delimited by an additional piston acting as overpressure piston on which a second compression spring acts in a direction of the high pressure chamber, the overpressure piston being able to bear against a fixed stop and a spring force of the second compression spring and the effective surface of the overpressure piston are so dimensioned that in the cold state, the overpressure piston is displaceable by a force applied to it by the hydraulic pressure and in the heated state, it is retained at the fixed stop by the second compression spring.

2. A tensioning device of claim 1 wherein the overpressure piston is mounted axially displaceably in the housing.

3. A tensioning device of claim 1 wherein the second compression spring is arranged in the housing.

4. A tensioning device of claim 2 wherein the second compression spring is arranged in the housing.

5. A tensioning device of claim 3 wherein the second compression spring is arranged between the overpressure piston and the damping piston.

6. A tensioning device of claim 1 wherein the second compression spring and the overpressure piston are arranged in a bore of the damping piston, which bore, together with the overpressure piston forms a second leakage gap which opens the high pressure chamber to the oil reservoir.

7. A tensioning device of claim 1 wherein the non-return valve is arranged at the overpressure piston.

8. A tensioning device of claim 1 wherein a stop ring for the overpressure piston is inserted in the damping piston into a ring groove starting at the bore of the damping piston.

* * * * *